US006630046B1

(12) United States Patent
Plötz

(10) Patent No.: US 6,630,046 B1
(45) Date of Patent: *Oct. 7, 2003

(54) METHOD OF MAKING WALL AND FLOOR COVERINGS

(75) Inventor: Kurt Plötz, Waldems (DE)

(73) Assignee: Johns Manville International, Inc., Denver, CO (US)

( * ) Notice: Subject to any disclaimer, the term of this patent is extended or adjusted under 35 U.S.C. 154(b) by 372 days.

This patent is subject to a terminal disclaimer.

(21) Appl. No.: 09/619,529

(22) Filed: Jul. 19, 2000

(30) Foreign Application Priority Data

| Oct. 16, 1999 | (DE) | 199 50 057 |
| Oct. 30, 1999 | (DE) | 199 52 432 |
| Nov. 18, 1999 | (DE) | 199 55 730 |
| Nov. 18, 1999 | (DE) | 199 55 713 |
| Jul. 30, 1999 | (DE) | 199 35 408 |
| Jul. 30, 1999 | (DE) | 199 35 531 |

(51) Int. Cl.⁷ .............................. B32B 31/00
(52) U.S. Cl. ............ 156/148; 156/180; 156/181; 156/296
(58) Field of Search .................. 156/167, 148, 156/181, 180, 296

(56) References Cited

U.S. PATENT DOCUMENTS

| 4,175,154 | A | * | 11/1979 | Faust et al. | 427/244 |
| 4,230,762 | A | | 10/1980 | Iwasaki et al. | |
| 4,511,619 | A | * | 4/1985 | Kuhnel et al. | 428/215 |
| 4,755,423 | A | | 7/1988 | Greiser et al. | |
| 5,017,426 | A | | 5/1991 | Greiser et al. | |
| 5,047,276 | A | * | 9/1991 | Chomarat et al. | 428/110 |
| 5,171,629 | A | * | 12/1992 | Heidel et al. | 442/383 |
| 5,458,960 | A | | 10/1995 | Nieminen et al. | |
| 6,412,154 | B1 | * | 7/2002 | Plotz | 156/148 |

FOREIGN PATENT DOCUMENTS

| DE | 26 22 206 | 12/1977 |
| DE | 3435 643 A1 | 4/1986 |
| DE | 36 05 830 A1 | 8/1987 |
| DE | 3901 152 A1 | 7/1990 |
| DE | G 92 07 367.0 | 10/1992 |
| DE | 43 39 709 A1 | 5/1995 |
| DE | 195 21 838 A1 | 12/1996 |
| DE | 195 43 991 A1 | 5/1997 |
| DE | 197 39 049 A1 | 3/1999 |
| EP | 0 132 325 B1 | 1/1985 |
| EP | 0 176 847 A2 | 4/1986 |
| EP | 0 185 169 A2 | 6/1986 |
| EP | 0 187 824 B1 | 7/1986 |
| EP | 0 226 471 A2 | 6/1987 |
| EP | 0 226 471 A3 | 6/1987 |
| EP | 0 242 524 A2 | 10/1987 |
| EP | 0 285 533 B1 | 10/1988 |
| EP | 0 315 507 A2 | 5/1989 |
| EP | 0 379 100 B1 | 7/1990 |
| EP | 0 403 403 A1 | 12/1990 |
| EP | 0 603 633 A1 | 6/1994 |
| EP | 0 646 454 A1 | 4/1995 |
| EP | 0 667 427 A1 | 8/1995 |
| EP | 08246358 | 9/1996 |
| EP | 0 806 509 A1 | 11/1997 |
| EP | 0 899 372 A2 | 3/1999 |
| EP | 0 900 869 A2 | 3/1999 |
| JP | 51-103570 A | * 9/1976 |
| JP | 53-58074 A | * 5/1978 |
| JP | 0010246453 AA | 10/1989 |
| JP | 0070052299 AA | 2/1995 |
| JP | 11-268159 | 1/1999 |
| WO | WO 90/15181 | 12/1990 |
| WO | WO 97/19219 | 5/1997 |
| WO | WO 98/17455 | 4/1998 |

* cited by examiner

Primary Examiner—Jeff H. Aftergut
(74) Attorney, Agent, or Firm—Burns, Doane, Swecker & Mathis, L.L.P.

(57) ABSTRACT

The present invention provides wall and floor coverings based on a carrier coated with one or more layers. The carrier includes a fiberglass containing mat consolidated with a binder, a non-woven made of organic synthetic fibers bonded with the fiberglass containing mat by needling. Part of the organic fibers penetrate through the fiberglass mat, and one or more layers coated on a glass fiber side of said carrier, opposite the non-woven synthetic mat.

15 Claims, No Drawings

METHOD OF MAKING WALL AND FLOOR COVERINGS

BACKGROUND OF THE INVENTION

1. Field of the Invention

This invention relates to wall and floor coverings based on a laminate carrier including a fiberglass mat and an organic synthetic non-woven, and to a method of preparing the same.

2. Description of the Related Art

Carriers composed of bonded fabrics are useful in roofing felts and insulation. They are particularly useful in wall and floor coverings of constructions such as residential and commercial structures.

A floor and wall covering is described in Patent Document WO 98/17455, wherein the covering is manufactured without the use of a carrier. A plastic material in the form of spherically shaped particles are placed on a substrate, such as a conveyor. A band conveyor made of steel is provided on which the spheres are sintered together.

Various other laminates employed as floor and wall coverings and their method of manufacturing are known in the art. For example, European Patent Document EP 0 132 325 B1 discloses a method for fixing a surface covering on a bottom covering. A glass mat is used as a carrier and it is coated with a PVC material.

Patent Document WO 97/19219 A1 discloses a floor covering based on a carrier coated on both sides. European Patent Document EP 0 899 372 A2 simply describes a coated textile glass mat.

Some of the disadvantages associated with the carrier laminates described above is the mechanical, dimensional and noise attenuation of these composites when they are used as wall or floor coverings.

To meet the requirements of the flooring and insulation industries, it is an object of the invention to provide a wall or flooring carrier laminate based on two or more layers including a fiberglass mat and an organic synthetic fibers non-woven, bound by needling.

It is another object of the present invention to provide a wall or floor covering having improved noise attenuation properties, and in particular reduced noise propagation, generated from walking a floor having such a covering.

It is a further object of the present invention to provide wall or floor coverings which are high adaptable to thermal changes and provides crack bridging which may occur. Nevertheless, these coverings provide sufficient elasticity.

It is yet another object of the present invention to provide a wall or floor covering based on a carrier having improved thermal and dimensional stability, wherein the carrier is easily reproduced and provides an increased comfort level (i.e., they are soft).

Other objects and aspects of the invention will become apparent upon review of the specification and claims appended thereto.

SUMMARY OF THE INVENTION

In accordance with a first aspect of the invention, wall and floor coverings based on a carrier coated with one or more layers is provided. The carrier includes a fiberglass containing mat consolidated with a binder, a non-woven made of organic synthetic fibers bounded with the fiberglass containing mat by needling. Part of the organic fibers penetrate through the fiberglass containing mat, and one or more layers coated on a glass fiber side of said carrier, opposite the non-woven synthetic mat.

In accordance with a second aspect of the invention, a method for manufacturing wall and floor coverings based on a carrier coated with one or more layers is provided. The process includes providing an organic synthetic fiber or chemical fiber non-woven, and a fiberglass containing mat pre-consolidated with a binder. The mat and the non-woven are bounded by needling such that a portion of the organic synthetic fibers penetrate through said fiberglass containing mat and optionally a part of the fibers emerges from the side of synthetic fiber non-woven and lies adjacent thereto. One or more layers are coated on the glass fiber side of the bounded carrier opposite the non-woven organic mat.

DETAILED DESCRIPTION OF THE PREFERRED EMBODIMENTS OF THE INVENTION

The invention will now be described with reference to the exemplary embodiments thereof. In an exemplary embodiment of the invention, wall and floor coverings based on a carrier coated with one or more layers. The carrier includes a fiberglass containing mat and an organic synthetic fibers non-woven bound by needling in a manner where part of the synthetic fibers may extend through the entire fiberglass mat, and preferably a part of the organic fiber lie adjacent to the side opposed to the non-woven organic non-woven. The laminate (e.g., composite) includes one or more layers coated on the same glass fiber side, opposite the non-woven.

The synthetic fibers can be staple fiber, but preferably filamentous fibers. These filamentous fibers are also known to those skilled in the art as "endless" fibers. The fibers are preferably organic synthetic fibers, such as polyester, polypropylene, polyamide or any other suitable chemical or synthetic fibers. Bico fibers can also be utilized.

The synthetic fibers non-woven can be pre-consolidated before bonding with the fiberglass mat by hydrodynamically, mechanically or thermal means. In addition, thermal fixation may be performed. Pre-consolidation can be also performed by a combination of these techniques.

The fiberglass mat is produced according to either the a so-called wet, or dry method, wherein fibers of E, C class, mixture thereof and ECR glass are pre-consolidated through the employment of preferably a water insoluble binder. Suitable binders include acrylate copolymerized with vinyl acetate, styrene, etc. Other suitable binders include acrylic, urea-formaldehyde or melamine formaldehyde, melamine and urea resins. The diameter of the glass fibers is about 8 to 16 $\mu$m, and preferably about 10 to 13 $\mu$m. The length of the fibers is about 8 to 32 $\mu$m. The weight of the glass mat produced is about 30 to 100 $g/m^2$, and preferably about 40 to 70 $g/m^2$. It will readily be recognized by the skilled artisan that up to 40 percent of the glass fibers can be substituted by other fibers. In particular, cellulose based fibers, polyacrylonitrile, polyester, polyamide, etc.

The organic synthetic non-woven of staple fiber can be made on a carding machine, which is well known in the art. Preferably, the filamentous non-wovens are made by the spunbond method described in DE OS 24 60 755 and herein incorporated by reference in its entirety. Several spinning beams or the like are utilized to manufacture the so-called curtains which are laid down on a moving conveyor in a randomly distributed arrangement.

The formed synthetic fiber mat is thermally fixed prior to bonding with the fiberglass mat by either calendering or through the utilization of a hot-air oven. Optionally, the mat is passed through an infrared path where the mat is exposed to radiation. In this manner, the thermal shrinking of the non-woven upon formation into a carrier laminate is removed, thereby avoiding a wave formation due to differential shrinkage phenomenon as a result of a subsequent thermal treatment (i.e., coating of the carrier laminate).

The synthetic fibers may be shrunk separately, and therefore before a non-woven is produced using these shrunken fibers. Preferably, the organic fibers are shrunk when they are present in the form of a non-woven or in the form of corresponding layers. The shrinking may take place before a mechanical or hydro-dynamical pre-consolidation. Optionally, the non-woven is shrunk after a corresponding pre-consolidation. The shrinking is preferably performed by heating in an oven at temperatures of about 140 to 220° C.

Upon obtaining the mats, the organic synthetic fibers non-woven is laid on the pre-consolidated fiberglass containing mat where they are mechanically needled together. Needling can be performed such that the needles penetrate the organic fiber non-woven and press part of the organic fibers through the fiberglass mat in a manner where part of the organic fibers emerge from the fiberglass mat, and optionally are adjacent thereto.

Preferably, the mats are bounded to each other by water beam needling (i.e., hydrodynamically). The needling takes place from the side of the non-woven synthetic, and with an increased water beam pressure. Preferably, the water beam pressure is in the range of about 100 to 400 bar, and even more preferably about 200 to 400 bar. Thus, a part of the fibers or filaments are pushed through the glass mats, while reducing the damage to glass and synthetic fibers. This process is further described in detail in co-pending application Ser. No. 09/619,528, filed Jul. 19, 2000, now U.S. Pat. No. 6,412,154, and hereby incorporated by reference in its entirety.

The two layer system needled together can subsequently be provided with a binder, in order to achieve a final consolidation. In this exemplary embodiment very small amounts of binder are employed. It is preferred that the binder is in a range of about 0 to 25 weight percent, and even more preferably 0 to 10 weight percent. The binder can be selected from the group including pure acrylates, copolymers of styrene, butadiene, acrylates and mixtures of duroplastic binders such as urea and melamine resins.

Thereafter, the formed carrier laminate is manufactured with one or more polymeric coatings applied to the fiberglass mat, away from the synthetic non-woven. Polyvinylchloride can be employed as a preferred coating. However, other polymers such as acrylates in the form of a paste, polyolefins contained in different kinds of mixtures and reproductive raw materials like natural resins can be employed. Coating compositions are further described in European Patent Document EP 0 132 325 B1 and Patent Document WO 97/19 219 which are hereby incorporated by reference in their entirety.

The coating may be placed through several techniques, such as the so-called "spread coating" (barber's knife) or the "calender" technique. In both techniques, a viscous polyvinyl-chloride (PVC) is pressed into the glass substrate. The coating temperature is dependent on the required viscosity for PVC. Typically a temperature of about 185° C. is sufficient in most applications.

The temperature required and the choice of coating materials also depends on the type of synthetic fibers. For example, polypropylene non-wovens require a temperature lower than 185° C., while polyester non-wovens can be heated to this temperature.

In accordance with the exemplified embodiment, several coating layers of different physical characteristics, and in particular hardness, can be placed on the carrier laminate. The coatings can in turn be layers, having a pattern or a colored designs. In addition, the outer layer can include embossing on the outer surface, to prevent slipping or other accidents that may occur. Naturally, the bond between the coatings and carrier is particularly improved where the synthetic fibers penetrate through the fiberglass mat and are adjacent to the underside of the fiberglass mat which is coated on a side away from the non-woven. The fibers provide an especially improved bond of the covering on the laminated material.

It will readily be recognized by those skilled in the art that modifications can be performed on the laminate to vary the physical and/or mechanical properties (e.g., hardness) of the wall and floor coverings. For example, the thickness of the floor and wall coverings can be varied by varying the thickness of the individual layers (i.e., the organic fibers non-woven and the fiberglass mat). Further, it is possible to vary the thickness of the final product depending on the application in which it is to be used, by varying the number of coatings and their layers.

In another exemplary embodiment, the wall and floor coverings are manufactured as described-above, no final consolidation with a binder is performed. This process is further described in co-pending application Ser. No. 09/619, 535, and is incorporated herein by reference in its entirety.

Thus, in accordance with the invention, wall and floor coverings having improved properties may be manufactured in an quick and facile manner, which is economically advantageous. For instance, the impact noise attenuation (e.g. reduced noise propagation from walking a floor) having such a covering and the bridging of cracks are excellent. The materials may adapt well to changes of the bottom floor or the wall. For example, thermal expansion of floors and crack formation due to stresses are compensated for, so that fissures do not extend to the surface of the covering.

The non-woven layer of synthetic organic fibers provides noise attenuation and improved elasticity. On the one hand, noise propagation from the room in which the noise is generated is reduced, and on the other hand, noise generated in the other rooms are muted in the rooms equipped with floor and wall covering prepared in accordance with the invention. Accordingly, improved insulation within an apartment or apartment building can be provided.

Furthermore, the layered laminate carrier manufactured in accordance with the invention, reduces the amount of glass fragments and dust produced, thus avoiding injury to the operator and reducing harm to the environment.

The formed laminate's thickness can be adjusted through the hydrodynamic needling method, or optionally through a secondary operation such as compression performed by a calender, a fabric-belt or laminate calender.

Furthermore, the product manufactured by the process outlined above provides dimensional stability and eliminates neck-down during coating or saturation PVC or other coating materials.

The invention will be further explained by the example provided below, wherein the carrier in accordance with the invention is manufactured

EXAMPLE

A glass staple fiber mat with $13\mu$ glass fibers having an area weight of 50 g/m² was pre-consolidated by a urea resin binder. A 80 g/m² polyester non-woven was manufactured using 2 dtex polyester filaments. The non-woven was heat treated and shrunk in an oven. Both layers were put together and hydrodynamically needled. The needling took place from the polyester side of the laminate using water jet pressure of 250 bar.

The maximum tensile load of the laminate was 378 N/5 cm at 60 percent elongation in machine direction and 186 N/5 cm at 79 percent in cross direction.

While the invention has been described in detail with reference to specific embodiments thereof, it will be apparent to those skilled in the art that various changes and modifications can be made, and equivalents employed, without departing from the scope of the claims that follow.

What is claimed is:

1. A method for manufacturing wall and floor coverings based on a carrier coated with one or more layers, comprising:

providing a non-woven layer containing organic synthetic fibers, providing a glass fiber-containing mat pre-consolidated with a binder, bonding said mat and the non-woven layer by hydrodynamically needling such that a portion of said organic synthetic fibers penetrate through said glass fiber-containing mat and beyond the surface thereof and emerges from a side of the glass fiber-containing mat opposite the synthetic fiber non-woven and lies adjacent thereto; and coating one or more polymeric layers on the glass fiber side of said bonded carrier opposite the non-woven organic mat.

2. The method according to claim 1, wherein said carrier is coated with PVC.

3. The method according to claim 1, wherein said organic fibers are polyester fibers.

4. The method according to claim 1, wherein said organic synthetic fibers are staple fiber mats.

5. The method according to claim 1, wherein said organic synthetic fibers non-woven is a filament non-woven.

6. The method according to claim 1, wherein said glass fiber mat is pre-strengthened by a water insoluble binder.

7. The method according to claim 6 wherein said water insoluble binder is a acrylate copolymer, copolymerized with vinyl acetate or styrene.

8. The method according to claim 6, wherein said insoluble binder is a melamine resin or a urea resin.

9. The method according to claim 1, wherein said organic synthetic fibers non-woven is pre-consolidated before bonding with said fiberglass containing mat.

10. The method according to claim 9, wherein said organic synthetic fibers non-woven is hydrodynamically or mechanically pre-consolidated.

11. The method according to claim 1, wherein said organic synthetic fibers non-woven is thermally pre-consolidated.

12. The method according to claim 1, wherein said organic synthetic fibers non-woven is thermally fixed (shrunk).

13. The method according to claim 1, wherein said fiberglass mat includes E, C class fibers, mixtures thereof and ECR glass.

14. The method according to claim 1, further comprising consolidating said carrier with an acrylate or styrene binder after bonding said fiberglass containing mat with said organic synthetic fibers non-woven.

15. The method according to claim 1, wherein said carrier does not include a binder for final consolidation.

* * * * *